United States Patent
Schejter (10) Patent No.: US 10,277,701 B2
(45) Date of Patent: Apr. 30, 2019

(54) METHODS AND SYSTEMS FOR REWRITING SCRIPTS TO DIRECT REQUESTS

(71) Applicant: Facebook, Inc., Menlo Park, CA (US)

(72) Inventor: Yoel Schejter, Tel Aviv (IL)

(73) Assignee: FACEBOOK, INC., Menlo Park, CA (US)

( * ) Notice: Subject to any disclaimer, the term of this patent is extended or adjusted under 35 U.S.C. 154(b) by 307 days.

(21) Appl. No.: 15/205,926

(22) Filed: Jul. 8, 2016

(65) Prior Publication Data

US 2018/0013848 A1    Jan. 11, 2018

(51) Int. Cl.
| G06F 15/16 | (2006.01) |
| H04L 29/08 | (2006.01) |
| G06F 17/30 | (2006.01) |

(52) U.S. Cl.
CPC .... *H04L 67/2814* (2013.01); *G06F 17/30867* (2013.01); *G06F 17/30887* (2013.01); *H04L 67/02* (2013.01)

(58) Field of Classification Search
CPC ................ H04L 67/2814; H04L 67/02; G06F 17/30867; G06F 17/30887; G06F 17/30896
USPC ........................................................ 709/219
See application file for complete search history.

(56) References Cited

U.S. PATENT DOCUMENTS 9,516,382 B2 * 12/2016 Paugh ................. H04L 12/2812
9,805,009 B2 * 10/2017 Lillesveen ............ G06F 17/227
2015/0025976 A1 * 1/2015 Guo ..................... G06Q 30/0267
                                                        705/14.64
2015/0067066 A1 * 3/2015 Radhakrishnan ....... H04L 51/08
                                                        709/206
2015/0334094 A1 * 11/2015 Suresh ................ H04L 63/0471
                                                        713/153
2015/0341285 A1 * 11/2015 Aysola ................ H04L 63/0428
                                                        370/392
2015/0379579 A1 * 12/2015 Chiang .............. G06Q 30/0267
                                                        705/14.64
2016/0092945 A1 * 3/2016 Stahl .................. G06Q 30/0282
                                                        705/7.29
2016/0182736 A1 * 6/2016 Tiger .................... H04W 48/18
                                                        455/406
2016/0191651 A1 * 6/2016 Balakrishnan ...... H04L 67/2847
                                                        709/219
2016/0210578 A1 * 7/2016 Raleigh ............ G06Q 10/06375

(Continued)

OTHER PUBLICATIONS

About Caja, Feb. 28, 2012, pp. 1-7, (https://developers.google.com/caja/does/about/).

*Primary Examiner* — Melvin H Pollack
(74) *Attorney, Agent, or Firm* — Morgan, Lewis & Bockius LLP (57) ABSTRACT

Methods and systems for rewriting scripts by a server system to direct requests generated from the scripts to pass through the server system. The proxy server receives a first request from the user device for a web page provided by a first web server. The proxy server then receives the web page from the first web server in response to the first request. The proxy server processes the web page. For example, the proxy server rewrites a script in the web page to direct requests generated by the script through the proxy server. The proxy server sends the processed web page, including the rewritten script, to the user device.

19 Claims, 6 Drawing Sheets

(56) References Cited

U.S. PATENT DOCUMENTS

| | | | | |
|---|---|---|---|---|
| 2016/0315857 | A1* | 10/2016 | Lubashev | H04W 4/025 |
| 2017/0006451 | A1* | 1/2017 | Mandanapu | H04L 43/028 |
| 2017/0019424 | A1* | 1/2017 | Rodrigues De Moura Leitao | H04L 63/08 |
| 2017/0126903 | A1* | 5/2017 | Cohen | H04M 15/62 |
| 2017/0178193 | A1* | 6/2017 | Jagannath | G06Q 30/04 |
| 2017/0272316 | A1* | 9/2017 | Johnson | H04L 41/28 |
| 2017/0293477 | A1* | 10/2017 | Takata | G06F 13/00 |
| 2017/0344344 | A1* | 11/2017 | Gass | G06F 8/40 |
| 2017/0364694 | A1* | 12/2017 | Jacob | G06F 21/6218 |
| 2017/0364794 | A1* | 12/2017 | Mahkonen | G06N 3/08 |
| 2017/0366395 | A1* | 12/2017 | Goldfarb | H04L 12/4633 |
| 2018/0074804 | A1* | 3/2018 | Gass | G06F 8/51 |
| 2018/0115796 | A1* | 4/2018 | Yang | H04L 1/00 |
| 2018/0124203 | A1* | 5/2018 | Alstad | H04L 67/303 |
| 2018/0144380 | A1* | 5/2018 | Herken | G06Q 10/10 |

* cited by examiner

METHODS AND SYSTEMS FOR REWRITING SCRIPTS TO DIRECT REQUESTS

TECHNICAL FIELD

This relates generally to network communications, including but not limited to rewriting scripts by a server system for directing requests generated from the scripts to pass through the server system.

BACKGROUND

Mobile devices have become an increasingly dominant means through which consumers access, download, and consume electronic content over the Internet.

Despite substantial advancements in telecommunications technology, however, affordable access to the Internet remains relatively low. Considering the limited affordability of Internet access in certain geographic regions, such as developing countries, consumers often have difficulty accessing the Internet and therefore are often left frustrated when using mobile devices. Recently, zero-rated Internet service has become an increasingly popular option to improve the affordability of Internet access. It is beneficial to serve the zero-rated content efficiently and effectively to the consumers.

SUMMARY

Accordingly, there is a need for methods, devices, and systems for improving network operability, for managing data exchanged between user devices and web servers, and for avoiding data leakage (e.g., a paid data leakage). Embodiments set forth herein are directed to methods, devices, and systems for rewriting scripts of web pages. Zero-rated (e.g., free) access to certain content (e.g., zero-rated content) on the Internet may be provided to users for no cost, while non-zero-rated (e.g., paid) access to other content (e.g., non-zero-rated content) on the Internet may also be offered on other terms. By having a proxy server route traffic exchanged between user devices and web servers, the user devices can access the Internet at predetermined rates or at no cost. The proxy server processes (e.g., rewrites) scripts of web pages received from web servers to ensure that any requests generated from the scripts pass through the proxy server. Thus paid data leakage can be avoided by intercepting requests for non-zero-rated content which may be generated by rendering one or more web pages.

In accordance with some embodiments, a computer-implemented method is performed at a server system (e.g., a proxy server) with one or more processors and memory storing instructions for execution by the one or more processors. The proxy server is coupled to one or more web servers and a user device. The method includes receiving, from a user device, a first request for a web page provided by a first web server. The method also includes receiving, in response to the first request, the web page from the first web server. The proxy server processes the web page. In some embodiments, the proxy server rewrites a script in the web page to direct requests generated by the script through the proxy server. The proxy server sends the processed web page, including the rewritten script, to the user device.

In accordance with some embodiments, an electronic device (e.g., a proxy server) may include one or more processors, memory, and one or more programs; the one or more programs are stored in the memory and configured to be executed by the one or more processors. The one or more programs include instructions for performing the operations of the above method. In accordance with some embodiments, a non-transitory computer-readable storage medium has stored therein instructions that, when executed by the electronic device, cause the electronic device to perform the operations of the above method.

In accordance with some other embodiments, a computer-implemented method is performed at a computing device (e.g., a user device) with one or more processors and memory storing instructions for execution by the one or more processors. The user device is coupled to a server system (e.g., a proxy server). The method includes displaying a list of identifiers of one or more web pages provided by respective web servers. The one or more web pages are zero-rated. The method further includes sending, to the proxy server, a request for a web page provided by a first web server. In response to the request, the user device receives, from the proxy server, a web page processed by the proxy server. The web page includes a script that has been rewritten by the proxy server to direct requests generated by the script through the proxy server.

In accordance with some embodiments, an electronic device (e.g., a user device) may include one or more processors, memory, and one or more programs; the one or more programs are stored in the memory and configured to be executed by the one or more processors. The one or more programs include instructions for performing the operations of the above method. In accordance with some embodiments, a non-transitory computer-readable storage medium has stored therein instructions that, when executed by the electronic device, cause the electronic device to perform the operations of the above method.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first list could be termed a second list, and, similarly, a second list could be termed a first list, without departing from the scope of the various described embodiments. The first list and the second list are both lists, but they are not the same list.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
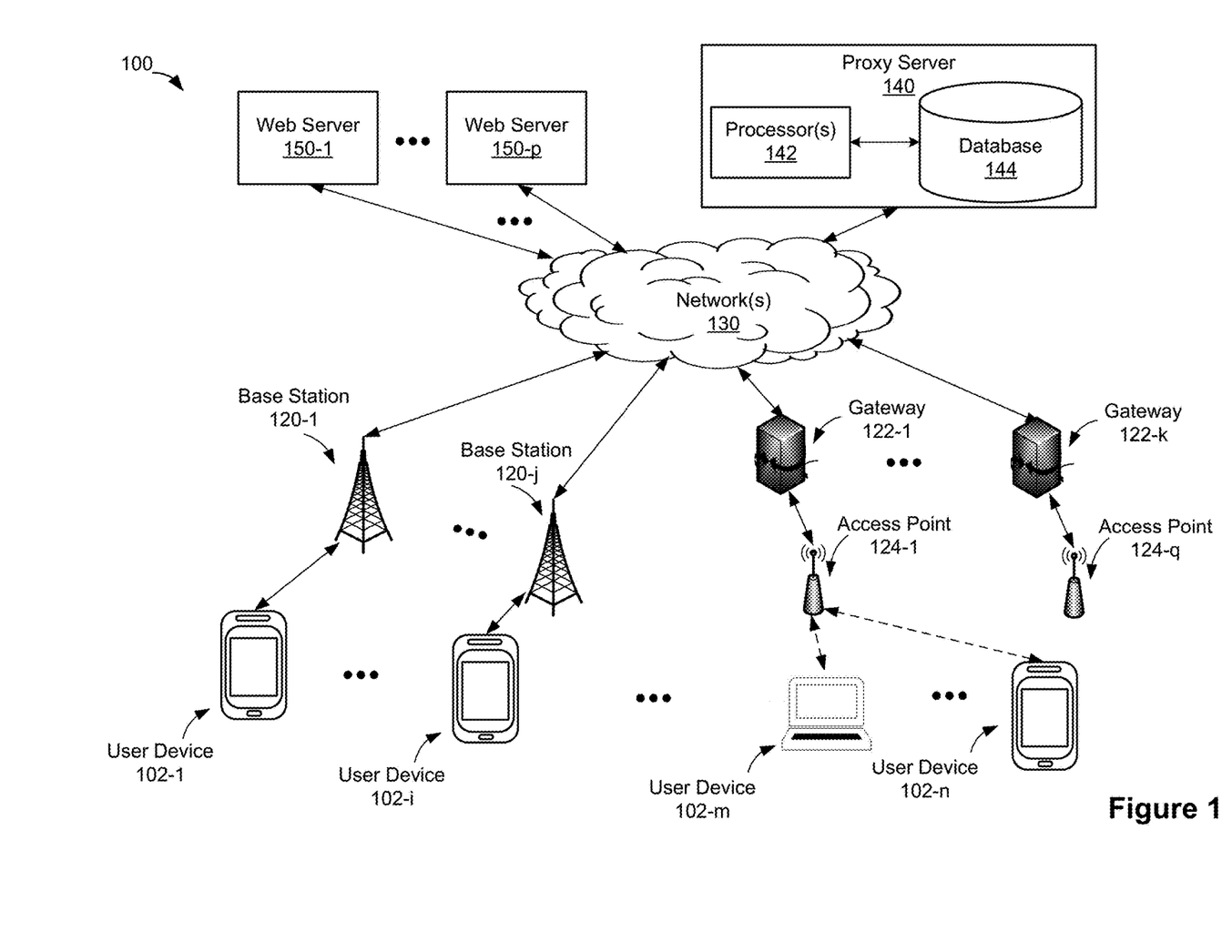
FIG. 1 is a block diagram illustrating a network architecture for providing network services, in accordance with some embodiments.

FIG. 1 illustrates a network architecture 100 in accordance with some embodiments. The network architecture 100 allows mobile carriers (and/or network providers) to provide one or more subscribers (e.g., users) Internet service with one or more pricing policies, e.g., for free (e.g., zero-rated), at special pricing, or at regular pricing. For example, a mobile carrier assigns respective pricing policies to IP addresses associated with one or more web servers which provide Internet content to subscribers. The creation of the pricing policies also take into consideration subscriber account types (e.g., pre-paid, zero-balanced, etc.), subscriber phone numbers, subscriber IP addresses, requested content types, applications running on subscriber devices, and/or other device features.

The network architecture 100 routes the traffic from one or more subscriber devices to destination IP addresses using predetermined pricing policies (e.g., free, special pricing, or regular pricing). The network architecture 100 thus provides various products and/or functionalities (e.g., a Free Basics user interface for zero-rated content) to the subscribers.

In some embodiments, a subscriber device can access one or more pre-determined IP addresses at predetermined pricing policies. For example, for zero-rating service, a subscriber device can download, upload, and/or view a webpage or use an application associated with a predetermined IP address for free, without being charged for network access. Thus these types of predetermined IP addresses are called zero-rated IP addresses. The content from zero-rated web pages and/or applications is called zero-rated content. In another example, for regularly priced services, a subscriber device can access one or more pre-determined IP addresses that are not zero-rated by paying service fees. These IP addresses that require paid network access are called non-zero-rated IP addresses (e.g., regular-priced IP addresses), and the content provided by the non-zero-rated IP addresses is called non-zero-rated content (e.g., regular-priced content). In yet another example, for specially priced services, a network operator may provide promotions, such as discounted pricing, for accessing certain IP addresses and/or certain content types (e.g., texts and/or images) from certain IP addresses. The specially priced service may be provided to certain subscribers as selected by the network operator.

The network architecture 100 includes client-side modules (e.g., as discussed with reference to FIG. 2) executed on a number of user devices (also called "client devices," "client systems," "client computers," "subscriber devices" or "clients") 102-1 . . . 102-$i$ . . . 102-$m$ . . . 102-$n$ and server-side modules (e.g., as discussed with reference to FIG. 3) executed on one or more server systems, such as a proxy server 140 and/or one or more web servers 150-1 . . . 150-$p$. The user devices 102 communicate with the server systems (e.g., the proxy server 140 and/or the one or more web servers 150) through one or more networks 130 (e.g., the Internet, cellular telephone networks, mobile data networks, other wide area networks, local area networks, metropolitan area networks, and so on). Client-side modules provide client-side functionalities for the network service platform (e.g., zero-rated Internet service, special priced Internet service, and regular priced Internet service) and communications with server-side modules. Server-side modules provide server-side functionalities for the network service platform (e.g., routing network traffic, serving internet content with specific pricing policies, and/or managing user account information) for any number of user devices 102.

In some embodiments, the user devices 102 are mobile devices and/or fixed-location devices. The user devices 102 are associated with subscribers (not shown) who employ the user devices 102 to access one or more IP addresses (e.g., including zero-rated IP addresses and/or non-zero-rated IP addresses). The user devices 102 execute web browser applications and/or other applications that can be used to access the one or more IP addresses.

Examples of the user devices 102 include, but are not limited to, feature phones, smart phones, smart watches, personal digital assistants, portable media players, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), wearable computing devices, personal digital assistants (PDAs), enhanced general packet radio service (EGPRS) mobile phones, media players, navigation devices, game consoles, smart televisions, remote controls, combinations of any two or more of these data processing devices or other data processing devices, and/or other appropriate computing devices that can be used to communicate with the proxy server 110 and the proxy server 140.

In some embodiments, the network architecture 100 includes one or more base stations 120-1 . . . 120-j for carrier networks that provide cellular service to the user devices 102. One or more network operators (e.g., network service providers, network carriers, or cellular companies) own or control the one or more base stations 120 and related infrastructure. For example, the base station 120 communicably connects one or more user devices 102 (e.g., 102-1) to one another (e.g., 102-i) and/or to the networks 130. In some embodiments, the network architecture 100 includes one or more gateways 122-1 . . . 122-k connected to one or more wireless access points 124-1 . . . 124-q respectively for providing Wi-Fi networks to the user devices 102 (e.g., 102-m, 102-n). The base stations 120 and the gateways 122 are responsible for routing traffic between the networks 130 and the user device 102.

In some embodiments, the proxy server 140 is implemented on one or more standalone computers or a distributed network of computers. In some embodiments, the proxy server 140 also employs various virtual devices and/or services of third party service providers (e.g., cloud computing) to provide the underlying computing resources and/or infrastructure resources of the proxy server 140. The proxy server 140 includes one or more processors 142 and one or more databases 144. The one or more processors 142 process requests for respective network services from the user devices 102, route or redirect requests from the user devices 102 to corresponding web servers 150, retrieve requested content from the web servers 150, process (e.g., rewrite) the retrieved content, and provide responses including the processed content to the user devices 102 with corresponding pricing policies. The database 144 stores various information, including but not limited to information related to subscribers, information related to network operators, and/or pricing policies.

In some embodiments, the one or more web servers 150-1 . . . 150-p include social networking servers configured to host various social networking functionalities. In some embodiments, the one or more web servers 150-1 . . . 150-p include third-party servers configured to provide other types of services. Exemplary third-party services including books, business, communication, contests, education, entertainment, fashion, finance, food and drink, games, health and fitness, lifestyle, local information, movies, television, music and audio, news, photos, video, productivity, reference material, security, shopping, sports, travel, utilities, social networking, and the like. In some embodiments, a given web server 150 hosts a website that provides web pages to user devices 102. Alternatively or additionally, a given web server 150 hosts an application that is used by user devices 102. As discussed above, the proxy server 140 may route or redirect requests from user devices 102 to respective web servers 150. In some embodiments, the proxy server 140 uses inline frames ("iframes") to nest independent websites within a web page (e.g., a zero-rated, a regular-priced, or a special-priced web page). In some embodiments, the proxy server 140 uses iframes to enable third-party developers to create applications that are hosted separately by a web server 150 (e.g., a third-party server), but operate within a user session and are accessed through the user's profile in the proxy server 140. In some embodiments, a given web server 150 is used to provide third-party content (e.g., news articles, reviews, message feeds, etc.). In some embodiments, a given web server 150 is a single computing device, while in other embodiments, a given web server 150 is implemented by multiple computing devices working together to perform the actions of a server system (e.g., cloud computing).

In some embodiments, the respective IP addresses of one or more web servers 150 are predetermined to be zero-rated IP addresses configured to provide zero-rated content to the user devices 102. A user device 102 does not need to pay data usage fees to a network provider for viewing, downloading, and/or uploading data to the one or more zero-rated IP addresses. In some embodiments, the respective IP addresses of one or more web servers 150 are non-zero-rated IP addresses (e.g., regular-priced or special-priced) that provide non-zero-rated (e.g., paid) content. A user device 102 pays a data usage fee to a network provider for viewing, downloading, and/or uploading data to the one or more non-zero-rated IP addresses.

Figure 2:
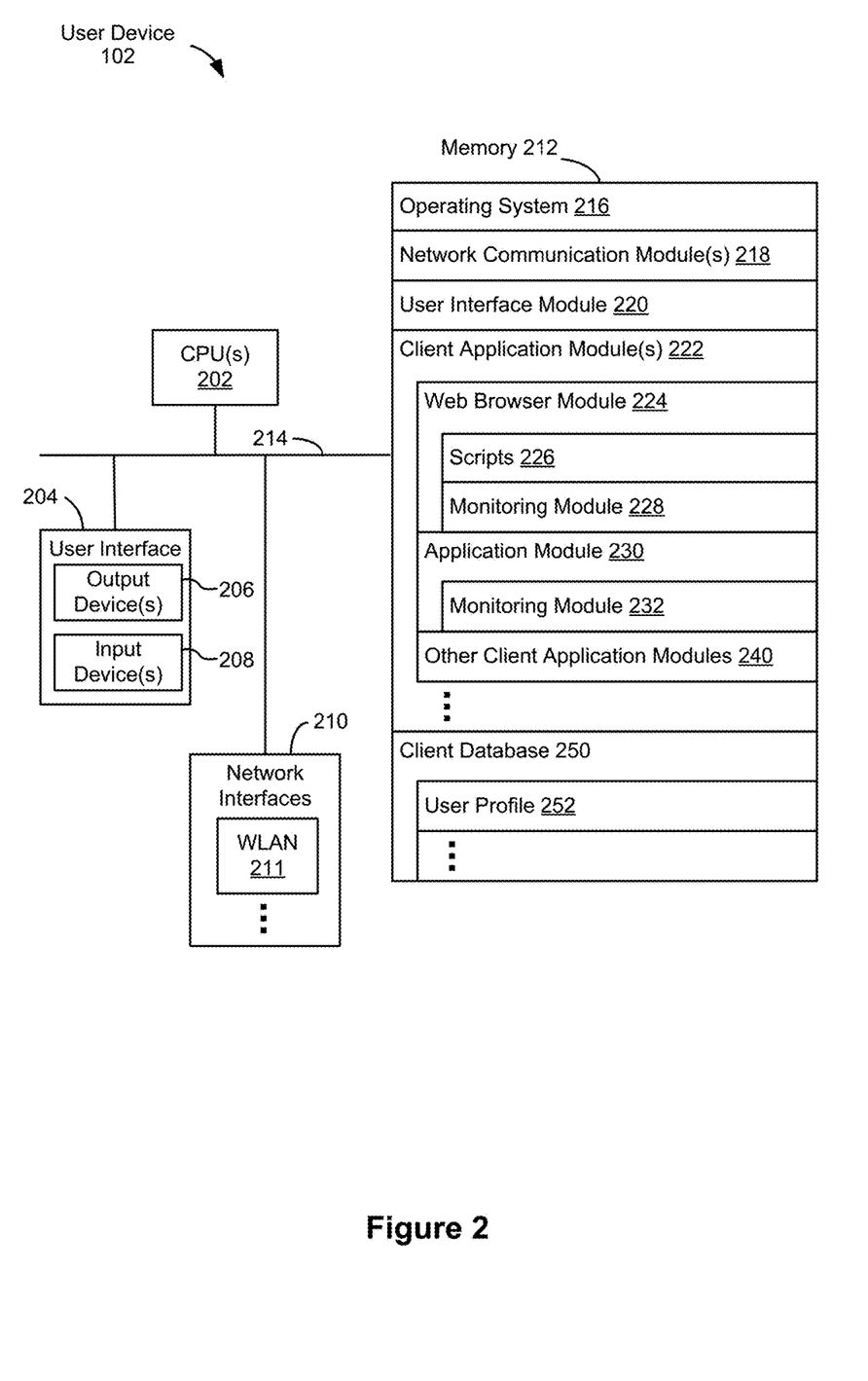
FIG. 2 is a block diagram illustrating a user device, in accordance with some embodiments.

FIG. 2 is a block diagram illustrating an exemplary user device 102 (e.g., one of the user devices 102-1 through 102-n, FIG. 1) in accordance with some embodiments. The user device 102 typically includes one or more central processing units (CPU(s)) (e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

The user device 102 includes a user interface 204, including output device(s) 206 and input device(s) 208. In some embodiments, the input devices include a keyboard or a track pad. Alternatively, or in addition, the user interface 204 includes a display device that includes a touch-sensitive surface, in which case the display device is a touch-sensitive display. In user devices that have a touch-sensitive display, a physical keyboard is optional (e.g., a soft keyboard may be displayed when keyboard entry is needed). The output devices 206 also optionally include speakers and/or an audio output connection (i.e., audio jack) connected to speakers, earphones, or headphones. Optionally, the user device 102 includes an audio input device (e.g., a microphone) to capture audio (e.g., speech from a user). Furthermore, some user devices 102 use a microphone and voice recognition software to supplement or replace the keyboard. Optionally, the user device 102 includes a location-detection device, such as a GPS (global positioning satellite) or other geo-location receiver, and/or location-detection software for determining the location of the user device 102.

In some embodiments, the one or more network interfaces 210 include wireless and/or wired interfaces for receiving data from and/or transmitting data to other user devices 102, the proxy server 140, the web servers 150, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, in some embodiments, the one or more network interfaces 210 includes a wireless LAN (WLAN) interface 211 for enabling data communications with other WLAN-compatible devices and/or the proxy server 140 (via the one or more network(s) 130, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- network communication module(s) 218 for connecting the user device 102 to other computing devices (e.g., the proxy server 140, the web servers 150, other user devices 102, and/or other devices) via the one or more network interface(s) 210 (wired or wireless);
- a user interface module 220 that receives commands and/or inputs from a user via the user interface 204 (e.g., from the input devices 208, which may include keyboards, touch screens, microphones, eye tracking components, three-dimensional gesture tracking components, and the like), and provides user interface objects and other outputs for display on the user interface 204 (e.g., the output devices 206, which may include a display screen, a touchscreen, a speaker, etc.);
- one or more client application modules 222, including the following modules (or sets of instructions), or a subset or superset thereof:
  - a web browser module 224 (e.g., Internet Explorer by Microsoft, Firefox by Mozilla, Safari by Apple, Opera by Opera Software, or Chrome by Google) for accessing, viewing, and interacting with web sites (e.g., zero-rated and/or non-zero rated web sites), which includes:
    - scripts 226 for the network service platform provided by the proxy server 140 (e.g., as embedded in a web page) and executed by the web browser module 224; and
    - monitoring module 228 for monitoring actions taken by the web browser module 224, and for blocking and reporting disallowed actions (e.g., sending a request that does not pass through the proxy server 140) to the proxy server 140;
  - an application module 230 for providing an interface to a network service application provided by the proxy server 140 and related features. For example, the application module 230 may provide links to the proxy server 140 but with the end destination being the one or more web servers 150-1 . . . 150-p. The application module 230 includes:
    - monitoring module 232 for checking whether URLs in the scripts have been rewritten (e.g., to include a rewritten signature) and for reporting the unsigned URL(s) to the proxy server 140; and
  - other optional client application modules 240, such as applications for social networking, word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support; and
- client database 250 for storing data associated with the network service platform, including, but is not limited to:
  - user profile 252 storing a user profile associated with the user of a client device 102 including, but not limited to, user account information, login credentials to the network service platform, payment data (e.g., linked credit card information, app credit or gift card balance, billing address, shipping address, etc.), bookmarked links (including zero-rated and/or non-zero rated), custom parameters (e.g., age, location, hobbies, etc.) of the user, contacts of the user, and identified trends and/or likes/dislikes of the user. For a given user, the user account information may include, for example, the user's name, profile picture, contact information, birth date, sex, marital status, family status, employment, education background, preferences, interests, and/or other demographic information.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments.

Figure 3:
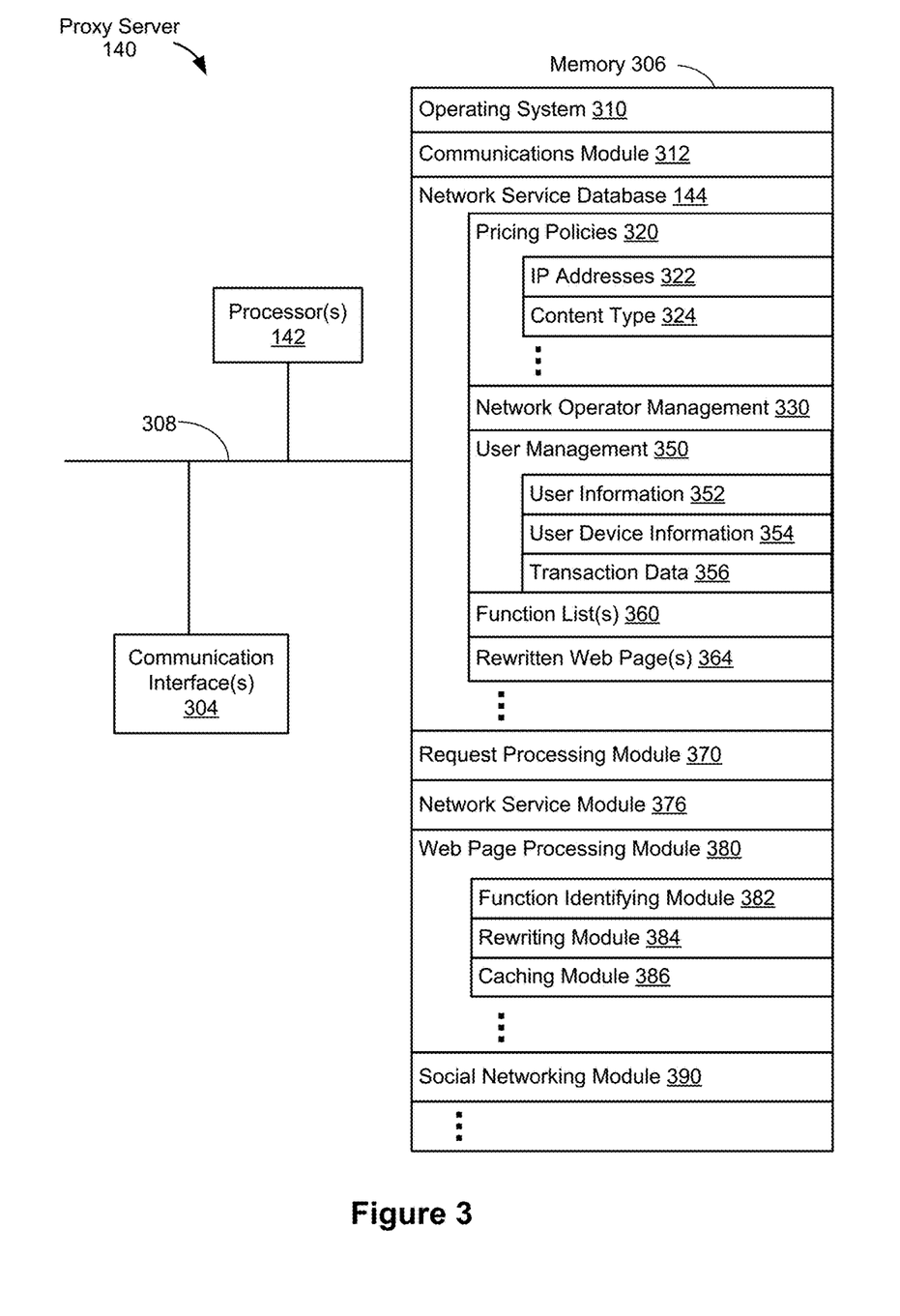
FIG. 3 is a block diagram illustrating a proxy server, in accordance with some embodiments.

FIG. 3 is a block diagram illustrating an exemplary proxy server 140 in accordance with some embodiments. The proxy server 140 includes one or more processing units (processors or cores) 142, one or more network or other communications interfaces 304, memory 306, and one or more communication buses 308 for interconnecting these components. The communication buses 308 optionally include circuitry (sometimes called a chipset) that interconnects and controls communications between system components. The proxy server 140 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 306 may optionally include one or more storage devices remotely located from the processor(s) 142. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 310 that includes procedures for handling various basic system services and for performing hardware dependent tasks;
- a network communication module 312 that is used for connecting the proxy server 140 to other computers via the one or more communication network interfaces 304 (wired or wireless) and one or more communication networks (e.g., the one or more networks 130);

a network service database 144 for storing data associated with the network service platform, which includes:

pricing policies 320, including but not limited to:

IP addresses 322 including, but not limited to, one or more predetermined zero-rated IP addresses, special-priced IP addresses, and/or regular-priced IP addresses; and content type 324 including, but not limited to, one or more content types (e.g., texts, images, and/or videos) for retrieval by the user devices 102 with predetermined pricing policies; and network operator management information 330 including network operator information such as network segment information, network type, IP addresses hosted by a respective network operator, etc.;

user management information 350, including but not limited to:

user information 352 such as user profiles, login information, privacy and other preferences, biographical data, and the like. In some embodiments, for a given user, the user information 352 includes data associated with the user's name, profile picture, contact information, birth date, sex, marital status, family status, employment, education background, preferences, interests, and/or other demographic information;

user device information 354 including, but not limited to, user device type, user device MAC address, and/or user device identifier; and transaction data 356 including, but not limited to, payment data (such as account balance, credit card information, app credit or gift card balance, billing address, shipping address, etc.) and/or purchased items (such as a network service type, data pack, etc.); and function list(s) 360 including one or more lists of different types of functions that can appear in a script of a web page; and rewritten web page(s) 364 including web pages that are rewritten and cached to serve subsequent requests for the same web pages; and a request processing module 370 for handling and responding to requests from user devices 102 regarding the network service platform;

a network service module 376 for providing network service (e.g., Free Basics service) with various pricing policies and related features (e.g., in conjunction with browser module 224 or application module 230 on the user device 102, FIG. 2);

a web page processing module 380 for processing web pages, the web page processing module 380 including but not limited to:

function identifying module 382 for identifying one or more types of functions in scripts of web pages received by the proxy server 140 using the function list(s) 360;

rewriting module 384 for rewriting scripts associated with functions identified by the function identifying module 382; and caching module 386 for caching scripts of web pages that are rewritten by the rewriting module 384; and a social networking module 390 for providing social-networking services and related features (e.g., in conjunction with web browser module 224 or social network application client module on the client device 102, FIG. 2).

In some embodiments, the network service module 376 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Figure 4:
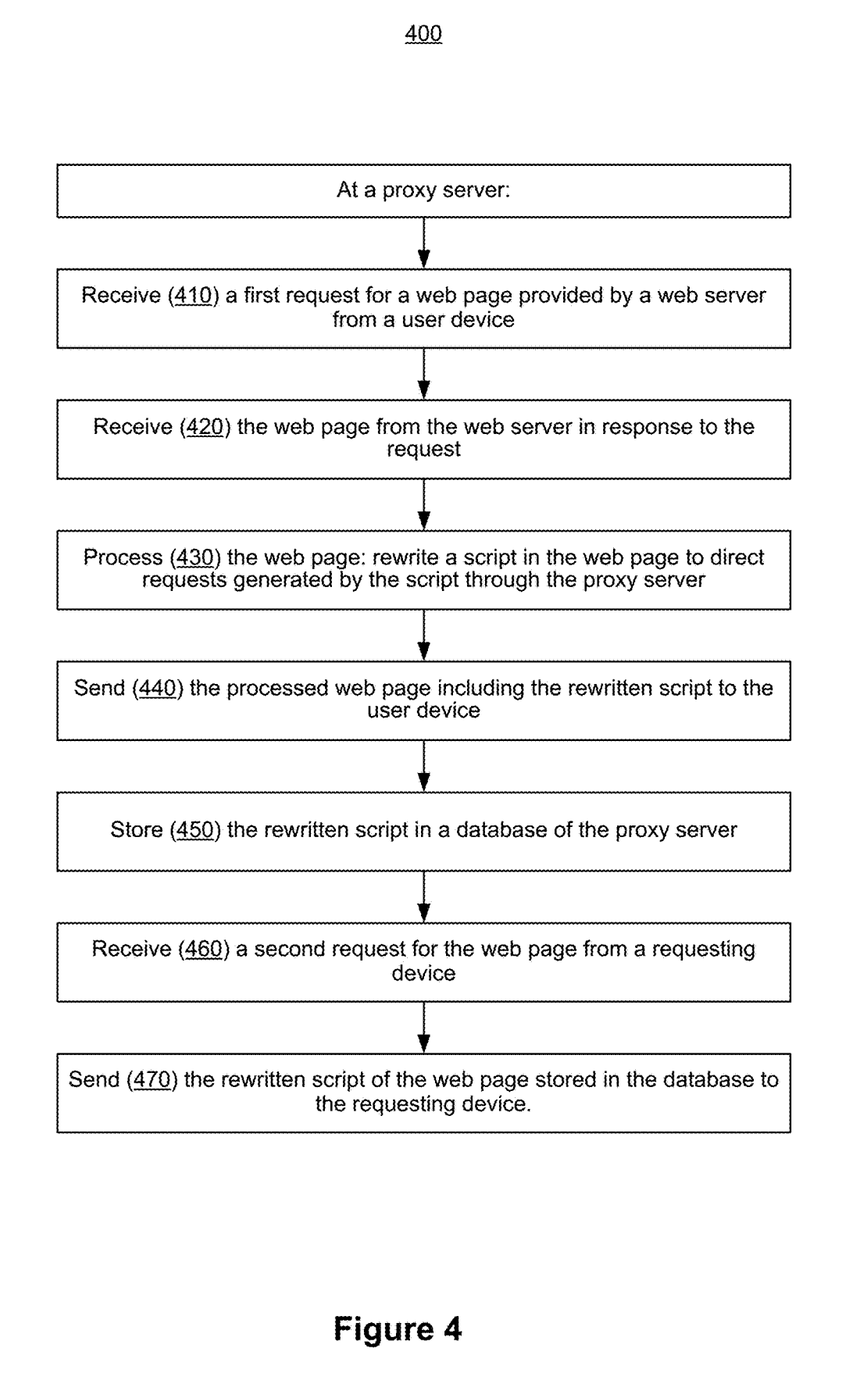
FIG. 4 is a flow diagram illustrating a method for rewriting scripts at a proxy server, in accordance with some embodiments.

FIG. 4 is a flow diagram illustrating a method 400 for rewriting scripts at the proxy server 140, in accordance with some embodiments. The method 400 is performed by a server system (e.g., proxy server 140, FIGS. 1 and 3). Operations performed in FIG. 4 correspond to instructions stored in computer memories (e.g., memories 306, FIG. 3) or other computer-readable storage mediums. In some embodiments, the user device described in method 400 is any user device 102 (FIGS. 1-2). In some embodiments, the web server described in method 400 is the web server 150 (FIG. 1).

In some embodiments, the proxy server 140 (e.g., the request processing module 370, FIG. 3) receives (410) a first request from a user device 102 (e.g., user device 102-1, FIGS. 1-2). The user device 102 sends the first request. The first request may be a request for a web page provided by a certain web server 150 (e.g., web server 150-1, FIG. 1). For example, a subscriber of the network service requests for a zero-rated web page that is retrievable by the user device 102 for free. Alternatively, the first request may be a request for a special-priced web page that is retrievable by the user device 102 at special pricing. The proxy server 140 processes the first request to recognize the pricing policy associated with the requested web page and to identify the corresponding web server 150 to which the first request is directed. The proxy server 140 then routes the request to the corresponding web server 150.

In response to the first request, the proxy server 140 receives (420) the requested web page from the corresponding web server 150. The received web page includes scripts written in one or more types of programming language that can be rendered by a web browser. In some embodiments, the scripts of the web page include HyperText Markup Language (HTML), Cascading Style Sheets (CSS), and/or JavaScript. The scripts of the web page may include URLs that, when selected by a user, would send requests to a web server 150 without passing through the proxy server 140. The scripts of the web page may also include JavaScript functions that, when executed on a user device 102, can generate new scripts.

To ensure all requests (e.g., including requests that can be generated from the scripts of the web page) sent from the user device 102 pass through the proxy server 140, the proxy server 140 (e.g., the web page processing module 380, FIG. 3) processes (430) the received web page before forwarding the web page to the user device 102. For example, the proxy server 140 rewrites (430) a script in the received web page to direct requests generated by the script through the proxy server 140.

In some embodiments, the script of the web page includes HTML code. The proxy server 140 identifies one or more URLs in the HTML code. The one or more identified URLs may not be directed to the proxy server 140. For example, the script of the web page includes an URL: www.example.

com hosted by a web server 150 (e.g., web server 150-*p*, FIG. 1). When a user device 102 renders the script including this URL, or when a user clicks this URL on the web page, the user device 102 generates and sends a request to the web server 150-*p* directly. This generated request does not pass through the proxy server 140. Thus there is no way to verify the pricing policy associated with the content served by the web server 150-*p* to the user device 102. This is not a problem when, for example, the user is in a zero-rated session, and the web page requested from the first request is zero-rated. However, it can become a problem if retrieving content from the server 150-*p* will charge the user at a certain price. This paid data leakage can negatively impact the user experience of using the zero-rated session. In order to avoid such paid data leakage, the proxy server 140 rewrites an identified URL to include an identifier of the proxy server 140 such that a request generated based on the rewritten URL will pass through the proxy server 140. The identifier of the proxy server 140 may include a domain name, an IP address, a port number, and/or a URL of the proxy server 140.

In some embodiments, the script of the web page includes JavaScript functions. As described in more detail below, the proxy server 140 (e.g., the function identifying module 382, FIG. 3) identifies one or more types of functions. The proxy server 140 (e.g., rewriting module 384, FIG. 3) then rewrites scripts associated with the identified functions. More details regarding processing the web page at the proxy server 140 are discussed later in method 500 with reference to FIG. 5.

After processing the received web page, the proxy server 140 sends (440) the processed web page including the rewritten script to the user device 102. The user device 102 (e.g., the web browser module 224, FIG. 2) renders the rewritten script of the web page for display on the user device 102.

In some embodiments, the proxy server 140 (e.g., the caching module 386, FIG. 3) stores (450) the rewritten script of the web page in a database (e.g., rewritten web page(s) 364 of the network service database 144, FIG. 3) of the proxy server 140. The rewritten scripts saved in the database can be used to serve subsequent requests of the same scripts.

In some embodiments, the proxy server 140 (e.g., the request processing module 370, FIG. 3) receives a second request for the same web page as being requested in the first request at step 410. The same user device 102 (e.g., the user device 102-1, FIG. 1) may send the second request. Alternatively, the second request may be sent from a different user device 102 (e.g., the user device 102-*i*, FIG. 1). The second request may be sent within the same session as or in a different session from the first request.

In some embodiments, instead of retrieving the web page from the corresponding web server 150 and rewriting the web page, the proxy server 140 recognizes that the requested web page has been processed (e.g., rewritten) previously (e.g., in response to the first request) and stored in the network service database 144. The proxy server retrieves the rewritten script of the web page from the network service database 144 (e.g., rewritten web page(s) 364, FIG. 3). The proxy server sends (470) the rewritten script of the web page to the user device 102 that sends the second request.

Figure 5:
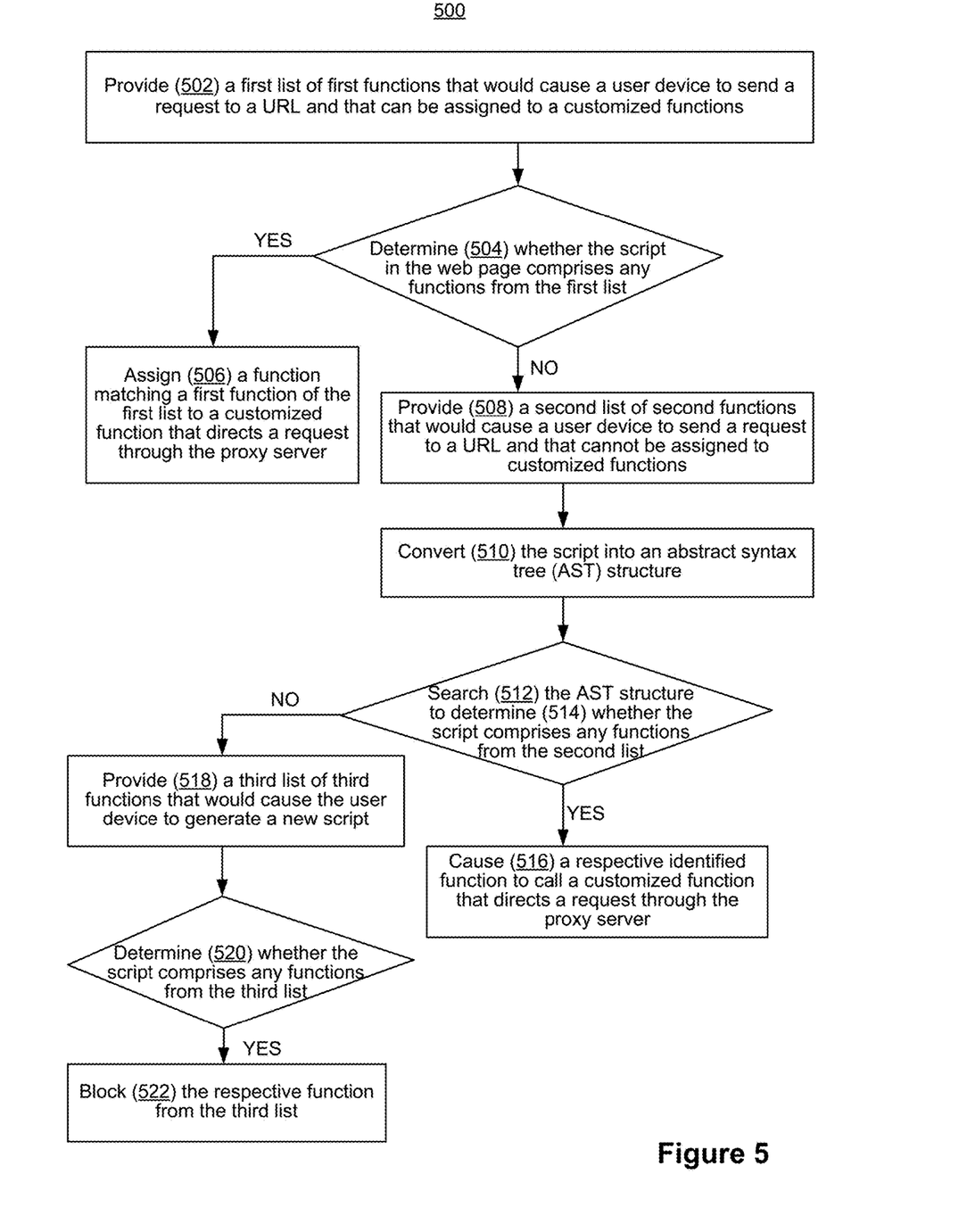
FIG. 5 is a flow diagram illustrating a method for rewriting scripts at a proxy server, in accordance with some embodiments.

FIG. 5 is a flow diagram illustrating a method 500 for rewriting scripts at the proxy server 140, in accordance with some embodiments. The method 500 includes one or more steps that are performed at step 430 of the method 400 in FIG. 4. The method 500 is performed by a server system (e.g., proxy server 140, FIGS. 1 and 3). Operations performed in FIG. 5 correspond to instructions stored in computer memories (e.g., memories 306, FIG. 3) or other computer-readable storage mediums.

In some embodiments, the proxy server 140 provides (502) a first list (e.g., a list of the function list(s) 360, FIG. 3) of one or more first functions that would cause a user device 102 to send a request to a URL. In some embodiments, the one or more first functions include JavaScript functions that can be assigned to respective customized functions. For example, the one or more first functions include, but are not limited to, "document.prototype.write", "document.prototype.writeln", "document.write", "document.writeln", "window.eval", "window.prototype.setTimeout", "window.prototype.setInterval", "window.prototype.open", "document.prototype.createElement", "element.prototype.setAttribute", "window.XMLHttpRequest.prototype.open", "Document.prototype.createElementNS", "Element.prototype.setAttributeNode", "HTMLElement.prototype.insertAdjacentHTML", "Node.prototype.appendChild", "Node.prototype.insertBefore", "Node.prototype.replaceChild", "window.XMLHttpRequest.prototype.open", and "window. Audio". In some embodiments, "window.eval" is assigned to a customized function that blocks the original functionality associated with the function "window.eval".

After receiving a web page from a web server 150 (e.g., after step 420 of the method 400, FIG. 4), the proxy server 140 (e.g., the function identifying module 382, FIG. 3) determines (504) whether a script of the web page comprises any functions from the first list. In some embodiments, when the proxy server 140 determines that a function in the script matches a first function from the first list (504-Yes), the proxy server 140 (e.g., the rewriting module 384, FIG. 3) assigns (506) the function to a customized function that directs a request through the proxy server 140. For example, the function identifying module 382 of the proxy server 140 identifies that the script includes a function "window.prototype.open". After invoking "window.prototype.open", a web browser can automatically navigate to another window to access a URL (e.g., www.example.com) defined by this function in the script. To avoid the user device 102 accessing a web server without passing through the proxy server 140, the rewriting module 384 of the proxy server 140 assigns the identified function to a customized function that is defined to direct to the proxy server 140 (e.g., window.prototype.open=customizedfunction). In some embodiments, a plurality of customized functions are predefined, and each function from the first list is assigned with a respective customized function of the plurality of customized functions. The customized function (e.g., "customized.function") may be defined to access a URL associated with the proxy server 140. When the web browser executes the function "window.prototype.open" in the script, the customized function will be invoked, and any subsequent requests generated based on "window.prototype.open" will be sent to the proxy server 140.

In some examples, when it is determined that one or more functions from the first list would cause the user device 102 to generate one or more requests, each function of such one or more functions is assigned to a customized function that changes the URL of the generated request to go via the proxy server 140. For example, the customized function changes the domain part of the URL of the generated request to be the domain of the proxy server 140. The domain of the proxy server 140 is initialized by a global variable. In some other examples, when it is determined that one or more functions from the first list would manipulate the document object model (DOM), each function of such one or more functions is assigned to a customized function for determining if an operation generated from such function is allowed. For example, "document.createElement" is assigned to a customized function, and when the customized function determines that "document.createElement" creates a video tag, the customized function blocks the functionalities, such as functionalities of creating a video tag, that are associated with "document.createElement". In yet some other examples, when it is determined that one or more functions from the first list would generate unsanitized JavaScript, each function of such one or more functions is assigned to a customized function that blocks a call from such function. For example, "window.eval" is assigned to a customized function that blocks any call from the function "window.eval".

In some embodiments, when the proxy server 140 determines that none of the functions in the script matches any first function of the first list (504-No), the proxy server 140 provides (508) a second list (e.g., a list of the function list(s) 360, FIG. 3) of one or more second functions that would cause a user device 102 to send a request to a URL. In some embodiments, the second functions include JavaScript elements (e.g., objects associated with values, properties, and/or attributes) that cannot be assigned to customized functions. The second list is different from the first list. The second functions are different from the first functions.

In some embodiments, the second functions include, but are not limited to, "window.location", "document.domain", "document.location", "location.assign", "location.replace", "function.prototype.apply", "function.prototype.bind", "function.prototype.call". In some embodiments, the second functions include document object model (DOM) nodes associated with attributes such as "src", "href", "innerHTML", or "outerHTML". In some embodiments, the second functions include properties associated with css manipulation, such as 'style', 'background', 'backgroundImage', 'listStyle', 'listStyleImage', 'content', 'cueAfter', 'cueBefore', 'cue', 'cursor', or 'playDuring', In some embodiments, the proxy server 140 (e.g., the rewriting module 384, FIG. 3) converts (510) (e.g., parses) the script into an abstract syntax tree (AST) structure. The AST represents the abstract syntactic structure of the script. The proxy server 140 (e.g., the function identifying module 382, FIG. 3) then searches (512) the AST structure. The proxy server 140 (e.g., the function identifying module 382, FIG. 3) determines (514) whether the script of the web page comprises any functions from the second list. In some embodiments, when the proxy server 140 determines that a function in the script matches a second function from the second list (514-Yes), the proxy server 140 (e.g., the rewriting module 384, FIG. 3) causes (516) the identified function (i.e., the matched function) to call a customized function that directs a request through the proxy server 140. For example, the proxy server (e.g., the rewriting module 384, FIG. 3) modifies the AST structure to call the customized function. In some embodiments, the proxy server 140 then rewrites the modified AST structure back to corresponding JavaScript code, and sends the rewritten JavaScript code to the user device 102.

In some embodiments, the proxy server injects a customized script defining the customized function into the script. In some embodiments, the customized script is injected into a portion of the script that defines metadata of the web page. For example, the customized script is injected into the HTML head of the script. The injected script can also be used for adding additional JavaScript sandboxing by changing global prototypes (e.g., element.prototype.setAttribute function).

In an example, the proxy server 140 searches the script to find a function from the second list, e.g., identifierExpression('src'). The proxy server 140 causes the identified function to call a customized function, e.g., identifierExpression('iorg_prop'). The customized function "iorg_prop" is defined in the injected script to direct to the proxy server 140. The script is rewritten in the above process such that a request generated by the script will not be sent to the URL defined by 'src' directly. Instead, the generated request will pass through the proxy server 140. In one example, an expression such as "image.src=http://server.com/image.jpg" is rewritten to be the expression iorg_prop(image, 'src', ["http://server.com/image.jpg"]).

In some embodiments, when the proxy server 140 determines that none of the functions in the script matches any second function of the second list (514-No), the proxy server provides (518) a third list (e.g., a list of the function list(s) 360, FIG. 3) of one or more third functions that would cause a user device 102 to generate a new script. In some embodiments, one or more third functions would cause a user device 102 to change existing script. In some embodiments, the third functions include, but are not limited to, "window.eval( )", "document.write( )", "doucment.writeln( )", "new Function( )", "setTimeout( )", "setInterval( )", "setImmediate( )". In some embodiments, the function "document.write" is allowed in the loading phase of the document. The proxy server 140 then determines whether the output element is related to an allowed content item. In accordance with a determination that the output element is not related to an allowed content item, the proxy server 140 removes the output element that is not allowed, such as videos and/or unsanitized JavaScript (e.g., embedded script elements).

In some embodiments, the proxy server 140 (e.g., the function identifying module 382, FIG. 3) determines (520) whether the script of the web page comprises any functions from the third list. In some embodiments, when the proxy server 140 determines that a function in the script matches a third function from the third list (520-Yes), the proxy server 140 (e.g., the rewriting module 384, FIG. 3) blocks (522) the identified function in the script.

In some embodiments, the steps 502, 508, and 518 occur simultaneously in a single step (not shown). For examples, prior to processing the script of the web page, the proxy server 140 stores different types of functions in corresponding lists (e.g., function list(s) 360, FIG. 3).

In some embodiments, the proxy server 140 checks the script against the first function list, the second function list, and the third function list separately and independently from each other, instead of following the logic sequence shown in method 500 of FIG. 5. The proxy server 140 rewrites the identified functions in ways in accordance with the types of the identified functions.

In one example, the proxy server 140 checks the script to determine whether any functions match the first functions from the first function list. The proxy server 140 assigns the identified function to a customized function that directs a request through the proxy server 140.

In another example, the proxy server 140 checks the script to determine whether any functions match the second functions from the second function list. The proxy server 140 parses the script into AST structure and causes second functions to call a customized function that directs a request through the proxy server 140.

In yet another example, the proxy server 140 checks the script to determine whether any functions match the third functions from the third function list. The proxy server 140 blocks the functions that match the third function functions.

Although not shown, in some embodiments, one or more steps disclosed in method 500 for rewriting scripts can be performed by the user device 102. For example, one or more modules configured to perform the proxy process described in method 500 can run at the client-side on the user device 102. In some examples, one or more steps disclosed in method 500 can be performed by a mobile application running on the user device 102.

Figure 6:
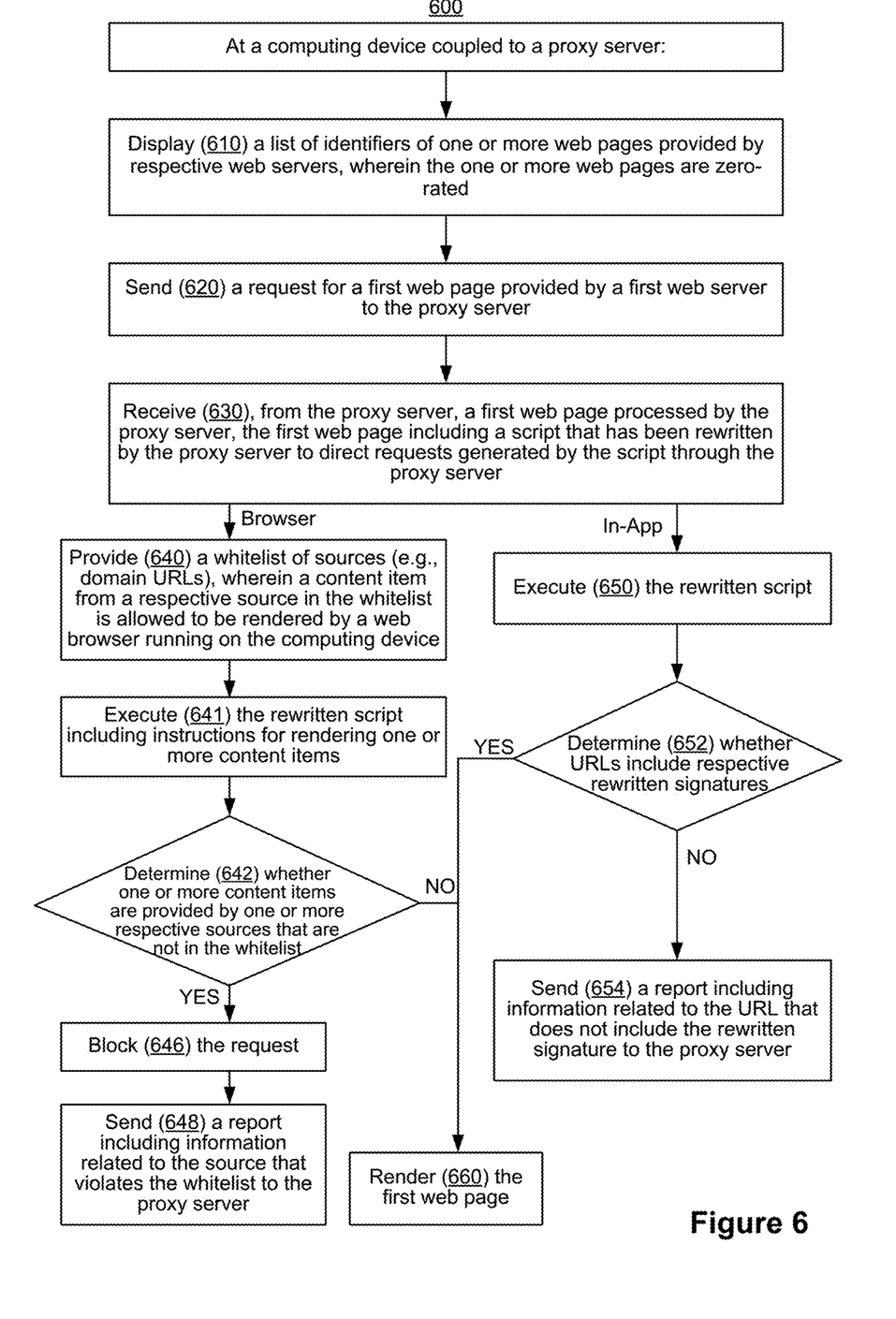
FIG. 6 is a flow diagram illustrating a method for handling rewritten scripts at a computing device coupled to the proxy server, in accordance with some embodiments.

FIG. 6 is a flow diagram illustrating a method 600 for handling rewritten scripts at a computing device coupled to the proxy server 140, in accordance with some embodiments. The method 600 is performed by a user device (e.g., a user device 102, FIGS. 1-2). Operations performed in FIG. 6 correspond to instructions stored in computer memories (e.g., memories 212, FIG. 2) or other computer-readable storage mediums. In some embodiments, the server system described in method 600 is the proxy server 140 (FIGS. 1 and 3). In some embodiments, the web server described in method 600 is any web server 150 (FIG. 1).

In some embodiments, the user device 102 displays (610) a list of identifiers of one or more web pages provided by respective web servers. The identifiers of the web pages include URLs, IP addresses, domain names, key words in hyperlinks, and/or other suitable formats. In some embodiments, the identifiers (e.g., URLs and/or the hyperlinks) of the web pages displayed on the user device 102 are directed to the proxy server 140, instead of directed to the corresponding web servers 150 hosting the respective web pages. In this way, any requests generated based on the identifiers of the web pages will pass through the proxy server 140 before being forwarded to any web servers 150. In some embodiments, the web pages include zero-rated web pages, special-priced web pages, and/or regular-priced web pages.

In some embodiments, the user device 102 receives a user input indicating a selection from the displayed list. For example, the user selects to view a zero-rated web page by interacting with (e.g., mouse clicking, finger tapping, audio inputting, etc.) the corresponding identifier of the zero-rated web page on the display. Upon receiving the user selection of a web page, the user device 102 generates and sends (620) a request for the selected web page (e.g., zero-rated) to the proxy server 140. In some embodiments, the proxy server 140 identifies that the web page is provided by a web server 150 (e.g., FIG. 1), and forwards the request to the corresponding web server 150.

In response to the request, the web server 150 returns the requested web page to the proxy server 140. The proxy server 140 rewrites the script of the web page to direct any requests generated by the script through the proxy server 140 as discussed earlier with reference to method 500 of FIG. 5 or combinations of the steps in method 500. The proxy server 140 forwards the rewritten scrip of the web page to the user device 102 (e.g., step 440 of method 400, FIG. 4). The user device 102 receives (630) the web page from the proxy server 140. The web page includes a script that has been rewritten by the proxy server 140 to direct requests generated by the script through the proxy server 140. In some embodiments, the rewritten script includes one or more URLs rewritten to include the identifier of the proxy server 140. An identifier of the proxy server 140 can be a domain name, an IP address, a port number, and/or a URL. In some embodiments, the rewritten script includes a customized function that, when invoked, directs a request through the proxy server 140.

In some embodiments, the script of the web page is rendered by a web browser (e.g., the web browser module 224 of the user device 102, FIG. 2). In order to avoid data leakage on the user device 102, for example, to avoid requests generated from the user device 102 being sent to a web server 150 without passing through the proxy server 140, or to avoid the user device 102 renders content items directly received from a web server 150, a policy is provided to specify actions allowed by the web browser module 224 running on the user device 102.

In some embodiments, the policy includes a whitelist of content sources. For example, the policy is a Content Security Policy (CSP) specifying one or more content sources that are allowed to be loaded on the user device 102. In some embodiments, the whitelist(s) of sources and/or functions are stored locally at the user device 102 (e.g., the client database 250, FIG. 2). In some embodiments, the whitelist(s) of sources and/or functions are defined in a HTTP header of a message and retrieved by the web browser module 224 (e.g., from the proxy server 140).

In some embodiments, a whitelist of sources is provided (640). A web page from a source listed in the whitelist is allowed to be rendered by the web browser module 224. In some embodiments, the whitelist includes domain names, IP addresses, URLs, and/or port numbers of allowed sources, such as zero-rated sources (e.g., providing zero-rated content). In some embodiments, the whitelist includes content sources for special-priced sources (e.g., providing special-priced content).

The user device 102 (e.g., the web browser module 224, FIG. 2) executes (641) the rewritten script of the web page. In some embodiments, the rewritten script includes instructions for rendering one or more content items of the web page.

In some embodiments, the web browser module 224 (e.g., the monitoring module 228, FIG. 2) determines (642) whether the one or more content items are provided by one or more respective sources that are not in the whitelist. For example, the monitoring module 228 checks the source field in the HTTP response message for each content item against the whitelist to ensure that all content items are from respective sources that are whitelisted.

In some embodiments, when the web browser module 224 (e.g., the monitoring module 228, FIG. 2) determines that a content item is provided by a source that is not in the whitelist (642-Yes), the web browser module 224 blocks (646) the request to render this content item. The web browser module 224 blocks rendering this content item. In some embodiments, the web browser sends (648) a report including information related to the source of the content item that violates the whitelist to the proxy server 140.

In some embodiments, when the web browser module 224 (e.g., the monitoring module 228, FIG. 2) determines that none of the content items in the web page is provided by a source that is not in the whitelist (642-No), (i.e., all content items in the web page are whitelisted), the user device 102 (e.g., the web browser module 224, FIG. 2) renders (660) the web page, including rendering all content items included in the web page. For example, when the web browser module 224 (e.g., the monitoring module 228, FIG. 2) determines a content item is provided by a source listed in the whitelist, the web browser module 224 renders this whitelisted content item of the web page.

In some embodiments, the application module 230 (e.g., the monitoring module 232, FIG. 2) monitors the received script of the web page. In some embodiments, when the proxy server 140 rewrites a URL in the script of the web page, the proxy server 140 applies a rewritten signature to the rewritten URL. The monitoring module 232 monitors the script to ensure that each URL in the script has a signature indicating the corresponding URL has been rewritten by the proxy server 140. In some embodiments, the application module 230 executes (650) the rewritten script of the web page.

In some embodiments, the monitoring module 232 determines (652) whether URLs included in the script include respective rewritten signatures. In some embodiments, when the monitoring module 232 determines the URLs in the script include respective rewritten signatures (652-Yes), the user device 102 renders (660) the received web page. In some embodiments, when the monitoring module 232 determines one or more URLs in the script do not include rewritten signatures (652-No), the user device 102 sends (654) a report including information related to the one or more URLs without rewritten signatures to the proxy server 140.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a proxy server having one or more processors and memory storing instructions for execution by the one or more processors, wherein the proxy server is coupled to one or more web servers and a user device:
      receiving, from the user device, a first request for a web page provided by a first web server;
      receiving, in response to the first request, the web page from the first web server;
      determining whether a script in the web page includes any functions that would cause the user device to send a request to a URL;
      in accordance with a determination that the web page includes one or more functions that would cause the user device to send a request to a URL:
         processing the web page, comprising rewriting the script in the web page to direct requests generated by the script through the proxy server; and
         sending the processed web page, including the rewritten script, to the user device.

2. The method of claim 1, wherein the web page is a zero-rated web page that is retrievable by the user device for free.

3. The method of claim 1, further comprising, at the proxy server:
   in accordance with a determination that the web page includes a first function that would cause the user device to send a request to a URL, replacing the first function with a customized function that directs requests through the proxy server.

4. The method of claim 1,
   wherein rewriting the script comprises:
      converting the script into an abstract syntax tree (AST) structure;
      searching the AST structure to identify any functions that would cause the user device to send a request to a URL; and
      replacing a first identified function with a call to a customized function that directs a request through the proxy server.

5. The method of claim 4, wherein one or more functions that would cause the user device to send a request to a URL cannot be assigned to customized functions to direct requests through the proxy server, the method further comprising, at the proxy server:
   providing a list of one or more second functions that can be assigned to customized functions to direct requests through the proxy server; and
   prior to rewriting the script, determining whether the script comprises any functions from the list;
   wherein the converting, searching, and causing are performed in accordance with a determination that any functions in the script are not from the list.

6. The method of claim 4, further comprising, at the proxy server, injecting a customized script defining the customized function into the web page.

7. The method of claim 6, wherein the customized script defining the customized functions is injected into a portion of the web page that defines metadata of the web page.

8. The method of claim 1,
   wherein processing the web page comprises:
      determining whether the script comprises any functions that would cause the user device to send a request to a URL; and
      in accordance with a determination that a respective function in the script matches a function that would cause the user device to send a request to a URL, blocking the respective function.

9. The method of claim 1, wherein the script comprises HTML code, and wherein the method further comprises:
   identifying one or more URLs in the HTML code; and
   rewriting the one or more URLs to include the identifier of the proxy server.

10. The method of claim 1, further comprising storing the rewritten script in a database of the proxy server.

11. The method of claim 10, further comprising, at the proxy server:
    receiving a second request for the web page from a requesting device; and
    responding to the second request, comprising sending the rewritten script of the web page stored in the database to the requesting device.

12. A method, comprising:
    at a computing device having one or more processors and memory storing instructions for execution by the one or more processors, wherein the computing device is coupled to a proxy server:
       displaying a list of identifiers of one or more web pages provided by respective web servers, wherein the one or more web pages are zero-rated;

sending, to the proxy server, a request for a first web page provided by a first web server; and in response to the request, receiving, from the proxy server, a first web page processed by the proxy server, the first web page including a script that has been rewritten by the proxy server to direct requests generated by the script through the proxy server.

13. The method of claim 12, further comprising, at the computing device:

providing a policy specifying actions allowed by a web browser running on the computing device.

14. The method of claim 13, wherein providing the policy comprises:

providing a whitelist of sources, wherein a content item from a respective source in the whitelist is allowed to be rendered by a web browser running on the computing device; and wherein the method further comprises:

executing the rewritten script of the first web page on the web browser, the rewritten script including instructions for rendering one or more content items included on the first web page;

determining, whether the one or more content items are provided by one or more respective sources that are not in the whitelist, and in accordance with a determination that a first content item is provided by a first source listed in the whitelist, rendering the first content item at the web browser.

15. The method of claim 14, further comprising, at the computing device:

in accordance with a determination that a second content item is provided by a second source that is not in the whitelist blocking rendering the second content item; and sending a report including information related to the second source that violates the whitelist to the proxy server.

16. The method of claim 12, wherein:

respective URLs in the rewritten script includes respective rewritten signatures; and the method further comprises, at the computing device, executing the rewritten script, comprising:

determining whether all URLs include respective rewritten signatures;

in accordance with a determination that a URL does not include a rewritten signature, sending a report including information related to the URL that does not include the rewritten signature to the proxy server.

17. The method of claim 12, wherein the rewritten script includes one or more URLs rewritten to include the identifier of the proxy server.

18. The method of claim 12, wherein the rewritten script includes a customized function that directs a request through the proxy server.

19. A non-transitory computer-readable storage medium storing one or more programs configured for execution by one or more processors of an electronic device, the one or more programs including instructions for:

receiving a web page from a first web server;

determining whether a script in the web page includes any functions that would send a request to a URL;

in accordance with a determination that the web page includes one or more functions that would cause a user device to send a request to a URL:

processing the web page, comprising rewriting the script in the web page to direct requests generated by the script through the proxy server; and sending the processed web page, including the rewritten script, to the user device.

* * * * *